(12) United States Patent
Gardner et al.

(10) Patent No.: US 9,810,335 B2
(45) Date of Patent: Nov. 7, 2017

(54) MULTI-LAYER ONE-WAY VALVE FOR PACKAGING

(75) Inventors: David Gardner, Strongsville, OH (US); Anne Shim, Hudson, OH (US)

(73) Assignee: CCL LABEL, INC., Framingham, MA (US)

( * ) Notice: Subject to any disclaimer, the term of this patent is extended or adjusted under 35 U.S.C. 154(b) by 0 days.

(21) Appl. No.: 14/397,107

(22) PCT Filed: Jul. 16, 2012

(86) PCT No.: PCT/US2012/046851
§ 371 (c)(1),
(2), (4) Date: Oct. 24, 2014

(87) PCT Pub. No.: WO2013/162636
PCT Pub. Date: Oct. 31, 2013

(65) Prior Publication Data
US 2015/0102030 A1    Apr. 16, 2015

Related U.S. Application Data

(60) Provisional application No. 61/639,279, filed on Apr. 27, 2012.

(51) Int. Cl.
*B65D 51/16* (2006.01)
*F16K 24/04* (2006.01)
(Continued)

(52) U.S. Cl.
CPC ............ *F16K 24/04* (2013.01); *B23P 15/001* (2013.01); *B65D 25/00* (2013.01); *B65D 77/225* (2013.01);
(Continued)

(58) Field of Classification Search
CPC .. B65D 77/225; B65D 2205/00; B65D 33/01; B65D 51/16; B65D 2307/724;
(Continued)

(56) References Cited

U.S. PATENT DOCUMENTS 4,134,535 A * 1/1979 Barthels ............... B65D 77/225
137/251.1
6,663,284 B2   12/2003 Buckingham et al.
(Continued)

FOREIGN PATENT DOCUMENTS

DE        3735064 A1    4/1989
EP        0274553 A1    7/1988
(Continued)

OTHER PUBLICATIONS

International Search Report and Written Opinion of the International Searching Authority, PCT/US2012/046851, dated Aug. 28, 2012.

*Primary Examiner* — Shawn M Braden
(74) *Attorney, Agent, or Firm* — McDonald Hopkins LLC

(57) ABSTRACT

A multi-layer one-way valve (100) includes: a first layer (10) having at least one first opening (12) formed therein; a second layer (20) having at least one second opening (22) formed therein; and, a third layer (30). The first and second layers are joined together such that at least one first channel (14) is defined therebetween, and the second and third layers are joined together such that at least one second channel (24) is defined therebetween. Additionally, an amount of flowable liquid is deposited in the first channel between the first and second openings. Suitably, the valve selectively opens to permit gas flow through the first and second channels in response to a pressure differential, the rate of gas flow through the valve is exponentially proportional to the pressure differential.

22 Claims, 15 Drawing Sheets

(51) Int. Cl.
  *B65D 77/22*  (2006.01)
  *B23P 15/00*  (2006.01)
  *B65D 25/00*  (2006.01)
  *F16K 13/10*  (2006.01)

(52) U.S. Cl.
  CPC .......... *F16K 13/10* (2013.01); *B65D 2205/00* (2013.01); *Y10T 29/49412* (2015.01); *Y10T 137/4643* (2015.04); *Y10T 137/7837* (2015.04)

(58) Field of Classification Search
  CPC ..... B32B 3/266; B32B 2250/03; F16K 24/04; B60K 2015/03276
  USPC ................ 220/203.03; 383/45, 100; 426/118
  See application file for complete search history.

(56) References Cited

U.S. PATENT DOCUMENTS

| | | | |
|---|---|---|---|
| 7,892,390 B2 | | 2/2011 | Zeik |
| 8,783,292 B2* | | 7/2014 | Hoffman ............. B65D 77/225 137/550 |
| 2003/0035597 A1 | | 2/2003 | Buckingham et al. |
| 2006/0008601 A1* | | 1/2006 | Zeik ......................... B32B 3/06 428/34.1 |
| 2012/0281933 A1* | | 11/2012 | Beer ......................... B31B 1/00 383/45 |
| 2014/0123600 A1* | | 5/2014 | Gardner ................ F16K 15/147 53/410 |

FOREIGN PATENT DOCUMENTS

| WO | 2007/113097 A1 | 10/2007 |
|---|---|---|
| WO | 2011056709 A1 | 5/2011 |

* cited by examiner

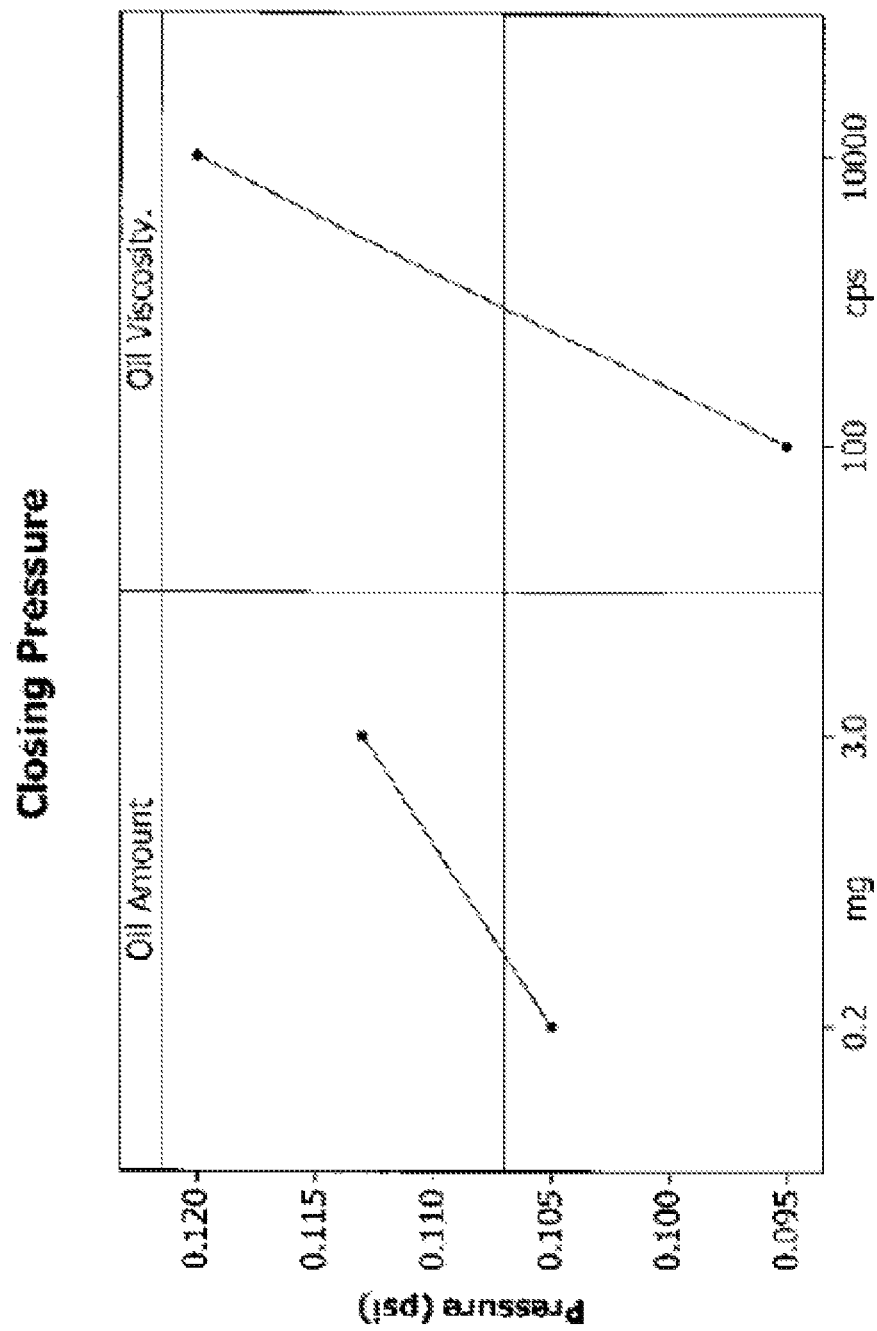

MULTI-LAYER ONE-WAY VALVE FOR PACKAGING

CROSS-REFERENCE TO RELATED APPLICATION

The present application is a 35 U.S.C. 371 national stage filing and claims priority to PCT Application No. PCT/US2012/046851, entitled "Multi-Layer One-Way Valve for Packaging" filed on Jul. 16, 2012, which claims the benefit of U.S. Provisional Patent Application No. 61/639,279 filed Apr. 27, 2012, which is incorporation herein by reference in its entirety.

FIELD

The present inventive subject matter relates generally to the art of fluid and/or gas control devices, such as valves. Particular but not exclusive relevance is found in connection with one-way valve assemblies, e.g., that provide a hermetic and/or fluid resistant seal but which still allow for the controlled expulsion of gas and related pressure from an interior of a bag, receptacle, container or other packaging. Accordingly, the present specification makes specific reference thereto. It is to be appreciated however that aspects of the present inventive subject matter are also equally amenable to other like applications.

BACKGROUND

Various types of packaging options are available today and are often used by consumers, industries, and numerous retailers to store food and other consumables for later use or consumption. It is often desirable for specific food retailers to present a product that appears attractive to consumers, e.g., to increase product sales and promote a particular brand.

Coffee beans have a tendency to release a significant amount of gas following the roasting process, even after the coffee beans have already been placed in a sealed bag, container or other like packaging. The presence of excessive gas and/or pressure within a sealed container or package may result in the container or package bulging and changing its shape or even bursting which can make the product unattractive to consumers and may impact the manufacturer by decreasing the amount of sales of those coffee beans.

Accordingly, one-way valves have heretofore been applied to packages containing roasted coffee beans in order to release excess gas from the interior of the container to the external environment, while inhibiting the flow of external gas and/or contaminates from the external environment into the otherwise sealed container or package. Such valves generally open in response to a small or minimal (i.e., near zero) pressure differential $\Delta P$ between the package interior and the external environment. That is to say, such valves generally remain open until the interior pressure is substantially equalized with the exterior pressure. Moreover, the flow rate of gas through the valve tends to be linear with respect to the aforementioned pressure differential. While generally useful, such valves can be undesirable in some instances and/or otherwise exhibit certain limitations.

For example, roasted coffee beans are commonly packaged at a relatively low altitude which tends to have a higher ambient external pressure as compared to higher altitudes, e.g., at which airplanes shipping the packaged coffee may fly. When the roasted coffee is initially packaged (e.g., at or near ground level), the pressure differential between the interior and exterior of the otherwise sealed packaging causes the valve to open and allow gas to escape the package. Accordingly, the pressure differential drops as the gas escapes and the pressure inside the packaging decreases. At some point, the pressure differential is no longer sufficient to keep the valve open, and the valve closes. Commonly, some gas remains trapped in the packaging at this point, and therefore some degree of interior pressure is retained. However, when the packaged coffee is then shipped by air freight or even trucked over mountains, at the relatively higher altitude the external pressure experienced by the package may be relatively lower than the external pressure at which the coffee was initially packaged. In this case, the pressure differential may again exceed a threshold at which point the valve reopens, thereby allowing additional gas that remained in the package to again be expelled. Accordingly, the pressure inside the package is lowered yet further until the valve once again closes. Finally, when the package is again brought to a lower altitude with a correspondingly higher external pressure, the container or package may appear compressed or crushed, e.g., due to the relatively lower interior pressure of the package that was achieved as a result of its shipping over a higher altitude route. In some instances, consumers may be displeased with the compressed or crushed appearance of the package and may therefore be less inclined to purchase the product. This can of course be undesirable from the view point of the coffee manufacturer and/or retailer.

Accordingly, a new and/or improved valve is disclosed which addresses the above-referenced problem(s) and/or others.

BRIEF SUMMARY

This summary is provided to introduce concepts related to the present inventive subject matter. The summary is not intended to identify essential features of the claimed subject matter nor is it intended for use in determining or limiting the scope of the claimed subject matter. The embodiments described below are not intended to be exhaustive or to limit the invention to the precise forms disclosed in the following detailed description. Rather, the embodiments are chosen and described so that others skilled in the art may appreciate and understand the principles and practices of the present inventive subject matter.

In accordance with one embodiment, a multi-layer control device or one-way valve is provided which includes: a first layer having at least one first opening formed therein; a second layer having at least one second opening formed therein; and, a third layer. The first and second layers are joined together such that at least one first channel is defined therebetween which selectively permits gas flow from the first opening to the second opening, and the second and third layers are joined together such that at least one second channel is defined therebetween which selectively permits gas flow from the second opening out of the device. Additionally, an amount of flowable liquid is deposited in the first channel between the first and second openings.

Suitably, the valve selectively opens to permit gas flow through the first and second channels in response to a pressure differential on opposing sides of the valve exceeding an opening threshold, e.g., in a range of about 0.05 psi (pounds per square inch) to about 1.0 psi (345 Pa to 6.89 kPa). In one exemplary embodiment, the opening threshold is in the range of about 0.1 psi (689 Pa) to about 0.5 psi (3.45 kPa). In still a further exemplary embodiment, the opening threshold is in the range of about 0.1 psi (689 Pa) to about 0.4 psi (2.76 kPa).

Additionally, when open, a rate of gas flow through the valve is suitably exponentially proportional to the pressure differential.

In accordance with another embodiment, a package is provided with the foregoing valve.

In accordance with still another embodiment, a method for making a one-way valve is provided. The method includes: providing a first layer; forming at least one first opening in the first layer; providing a second layer; forming at least one second opening in the second layer; joining the first and second layers together such that at least one first channel is defined therebetween which selectively permits gas flow from the first opening to the second opening; providing a third layer; joining the second and third layers together such that at least one second channel is defined therebetween which selectively permits gas flow from the second opening out of the valve; and, supplying an amount of flowable liquid in the first channel between the first and second openings.

Numerous advantages and benefits of the inventive subject matter disclosed herein will become apparent to those of ordinary skill in the art upon reading and understanding the present specification. It is to be understood, however, that the detailed description of the various embodiments and specific examples, while indicating preferred and other embodiments, are given by way of illustration and not limitation. Many changes and modifications within the scope of the present invention may be made without departing from the spirit thereof, and the invention includes all such modifications.

BRIEF DESCRIPTION OF THE DRAWINGS

The following detailed description makes reference to the figures in the accompanying drawings. However, the inventive subject matter disclosed herein may take form in various components and arrangements of components, and in various steps and arrangements of steps. The drawings are only for purposes of illustrating exemplary, preferred and/or other embodiments and are not to be construed as limiting. Further, it is to be appreciated that the drawings may not be to scale.

FIG. 12 is a graph showing a mean main effect on a closing threshold of valves such as the one depicted in FIG. 1, as a result of manipulating the oil or other liquid amount and viscosity in such valves.

DETAILED DESCRIPTION

Figure 1:
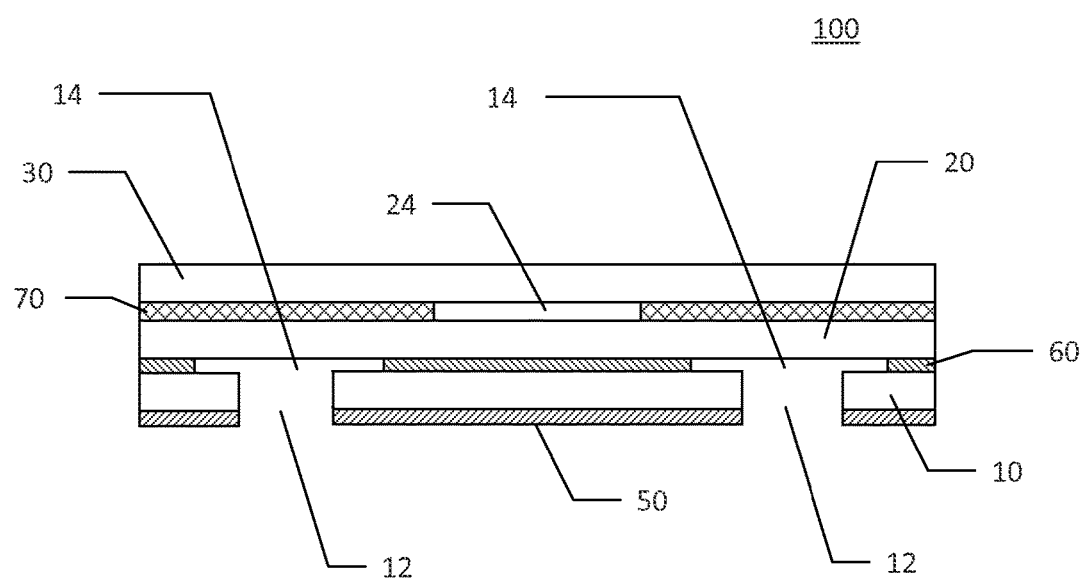
FIG. 1 is a diagrammatic illustration showing a cross-section of an exemplary valve in accordance with aspect of the present inventive subject matter, the cross-section being taken along section line A-A, e.g., as shown in FIGS. 2a and 2b.

The apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figure.

The present inventive subject matter relates generally to a multi-layer fluid control device or one-way valve that allows for the expulsion of air, gas and/or other unwanted components from an interior of an otherwise sealed container or package, while providing a protective seal that prevents or inhibits unwanted air, gas, moisture and/or other components or contaminates found in an exterior of the container or package from entering the interior thereof. Suitably, the protective seal provided by the multi-layer control device or one-way valve may be a hermetic or water resistant seal which permits fluid and/or gas flow therethrough in one direction (e.g., from an interior to an exterior of a package), while preventing or inhibiting fluid and/or gas flow therethrough in an opposite direction (e.g., from an exterior to an interior of a package). Accordingly, the outlet of gas from an interior of a package fitted with such a valve protects against an undesirable build-up of excessive pressure inside the otherwise sealed package.

Suitably, the valve only opens (e.g., to release gas from an interior of the package) when the pressure differential $\Delta P$ between the package's internal pressure $P_I$ and the external pressure $P_E$ exceeds a given threshold $T_O$. That is to say, the valve is open when $\Delta P = P_I - P_E > T_O$, thereby allowing gas to flow through the valve from an interior of the otherwise sealed package to an exterior thereof. Conversely, the valve closes when the pressure differential drops below a given threshold $T_C$, i.e., the valve closes when $\Delta P = P_I - P_E < T_C$, thereby inhibiting gas flow through the valve. In one exemplary embodiment, the threshold $T_O$ is in the range of approximately 0.05 psi (345 Pa) to approximately 1.0 psi 6.89 kPa). In another exemplary embodiment, $T_O$ is in the range of approximately 0.1 psi (689 Pa) to approximately 0.5 psi (3.45 kPa). In still a further exemplary embodiment, $T_O$ is in the range of approximately 0.1 psi (689 Pa) to approximately 0.4 psi (2.76 kPa). Suitably, $T_C$ is in the range of approximately 0.05 psi (345 Pa) to approximately 0.3 (2.07 kPa). In one embodiment, $T_C$ is in the range of approximately 0.1 psi (689 Pa) to approximately 0.2 psi (1.38 kPa), and in yet another embodiment, $T_C$ is in the range of approximately 0.12 psi (827 Pa) to approximately 0.17 psi (1.17 kPa).

Additionally, the valve is suitably constructed and/or arranged such that when open the flow rate R of gas therethrough is exponentially or roughly exponentially proportional to the pressure differential $\Delta P$. That is to say, in a curve plotted to represent the flow rate of gas through the value as a function of the pressure differential $\Delta P$, at least some portion of the curve is substantially exponential. For example, at least some portion of the curve substantially satisfies the equation $R \propto k\Delta P^x$, where k is a constant of proportionality and x is a positive, non-zero exponent.

Figure 5:
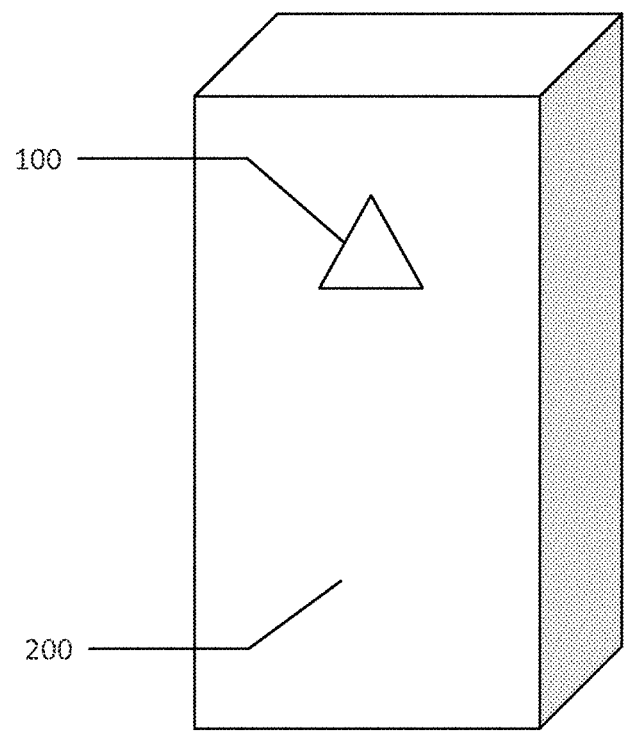
FIG. 5 is a diagrammatic illustration showing the valve of FIG. 1 applied to a package.

Referring now to the figures and initially to FIG. 1, there is shown an exemplary multi-layer control device or one-way valve 100 suitable for practicing aspects of the present inventive subject matter and exhibiting the aforementioned operative properties. As illustrated, the valve 100 includes a base layer 10, an intermediate layer 20 and a top layer 30 joined together by respective layers or coatings of adhesive or the like. In particular, a first layer or coating of adhesive 50 resides on a first or underside of the base layer 10; a second layer or coating of adhesive 60 resides between a second or topside of the base layer 10 (i.e., opposite the first or underside of the base layer 10) and a first or underside of the intermediate layer 20; and, a third layer or coating of adhesive 70 resides between a second or topside of the intermediate layer 20 (i.e., opposite the first or underside of the intermediate layer 20) and a first or underside of the top layer 30. As can be appreciated, the second layer of adhesive 60 joins the base and intermediate layers 10 and 20 together, and the third layer of adhesive 70 joins the intermediate and top layers 20 and 30 together. Suitably, the first layer of adhesive 50 is used to attach the valve to a wall or surface of an otherwise sealed or closed receptacle, container or package 200, e.g., as shown in FIG. 5.

Figure 2A:
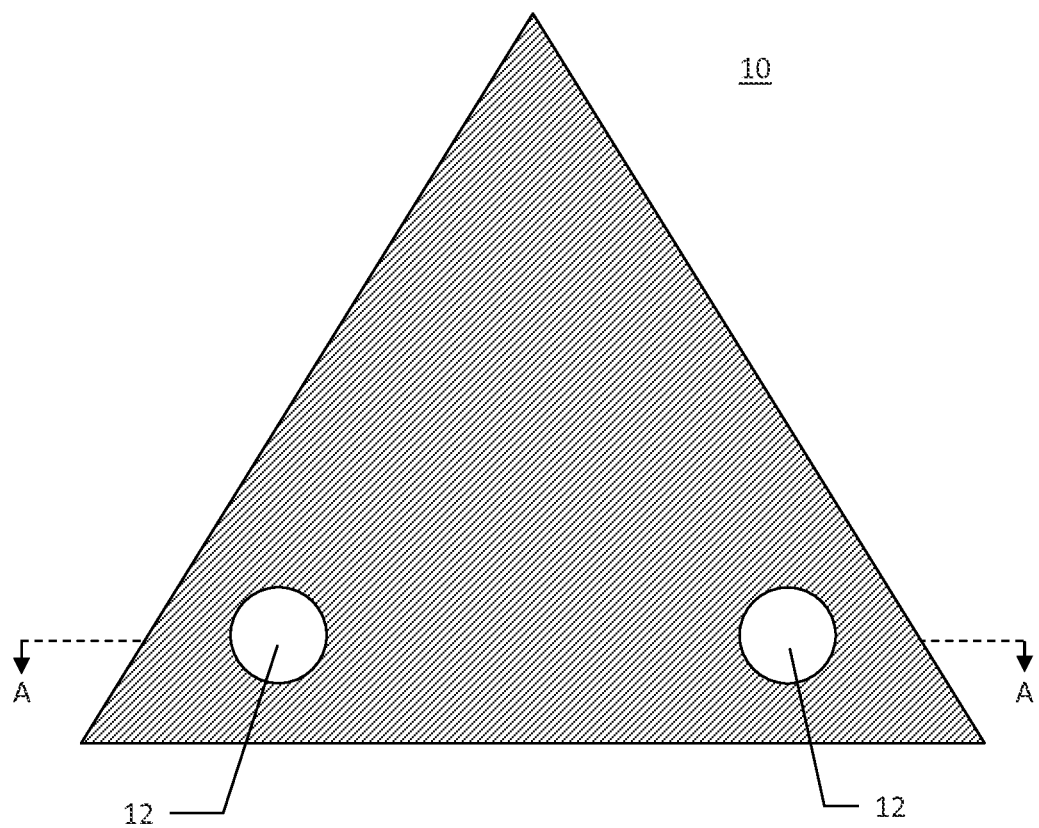
FIGS. 2a and 2b are diagrammatic illustrations showing opposing first and second sides of a base layer from the valve illustrated in FIG. 1.

With reference now to FIG. 2a, there is shown the first or underside of the base layer 10. In the illustrated embodiment, two apertures, openings or holes 12 are formed in the base layer 10. The hatching in FIG. 2a indicates the area where the first layer of adhesive 50 resides on the first or underside of the base layer 10. In this case, the first layer of adhesive 50 may be substantially coextensive with the entire first or underside of the base layer 10.

Figure 2B:
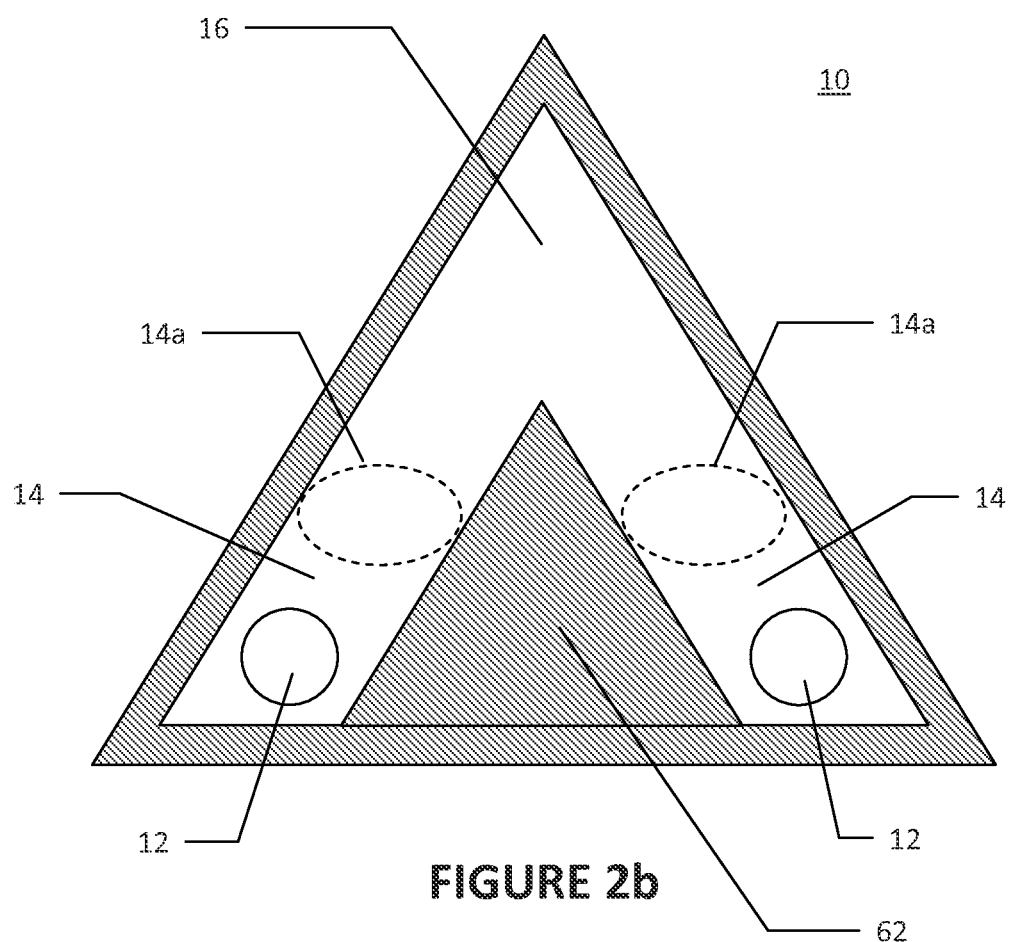

With reference now to FIG. 2b, there is shown the second or topside of the base layer 10. The hatching in FIG. 2b indicates the area where the second layer of adhesive 60 resides with respect to the second or topside of the base layer 10. As shown, the adhesive layer 60 essentially surrounds a perimeter of the base layer 10 and further includes a protruding region 62 that extends between the holes 12. Accordingly, when the intermediate layer 20 is positioned atop or otherwise in contact with the adhesive layer 60, there is defined a pair of channels 14 extending from the holes 12 and meeting at an apex or region 16 with respect to the second or topside of the base layer 10.

Figure 3A:
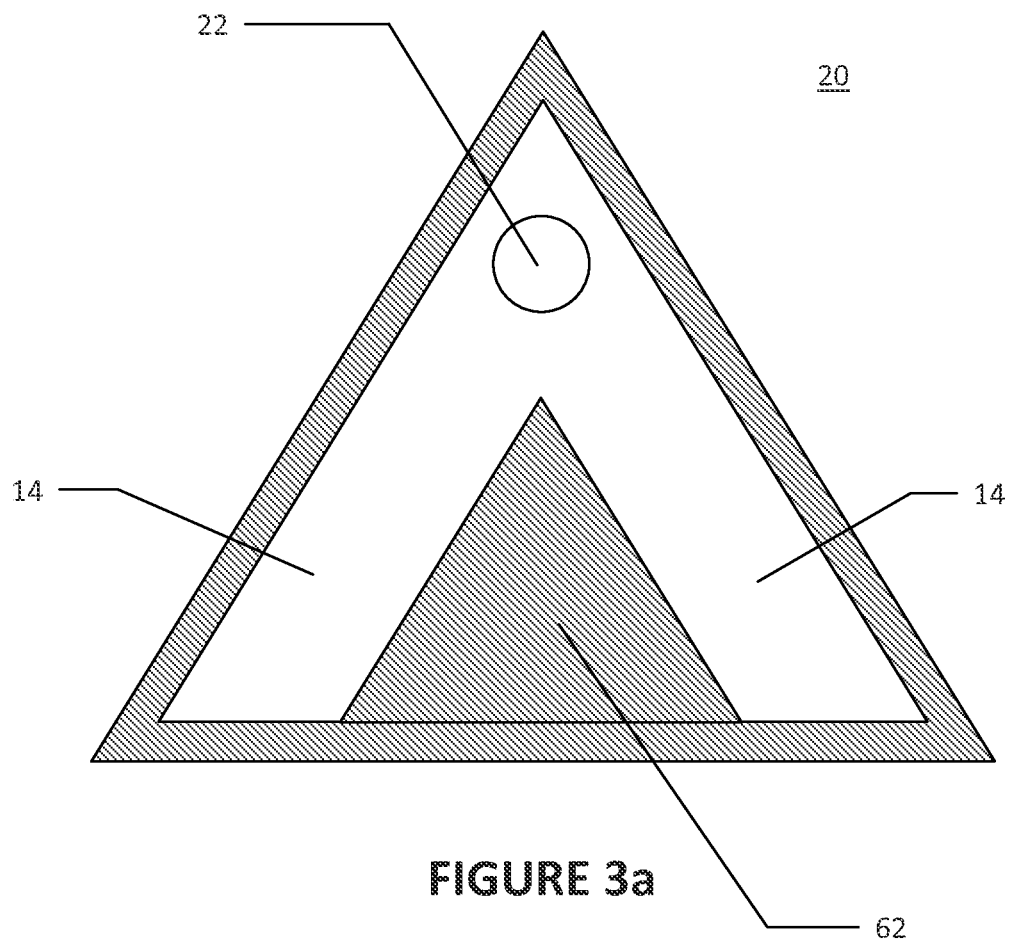
FIGS. 3a and 3b are diagrammatic illustrations showing opposing first and second sides of an intermediate layer from the valve illustrated in FIG. 1.

With reference now to FIG. 3a, there is shown the first or underside of the intermediate layer 20. The hatching in FIG. 3a indicates the area where the second layer of adhesive 60 resides with respect to the first or underside of the intermediate layer 20. In the illustrated embodiment, an aperture, opening or hole 22 is formed in the intermediate layer 20. Suitably, when the valve 100 is constructed or assembled, the hole 22 substantially aligns with the region 16 so as to be in selective fluid communication with the holes 12 via the channels 14.

Figure 3B:
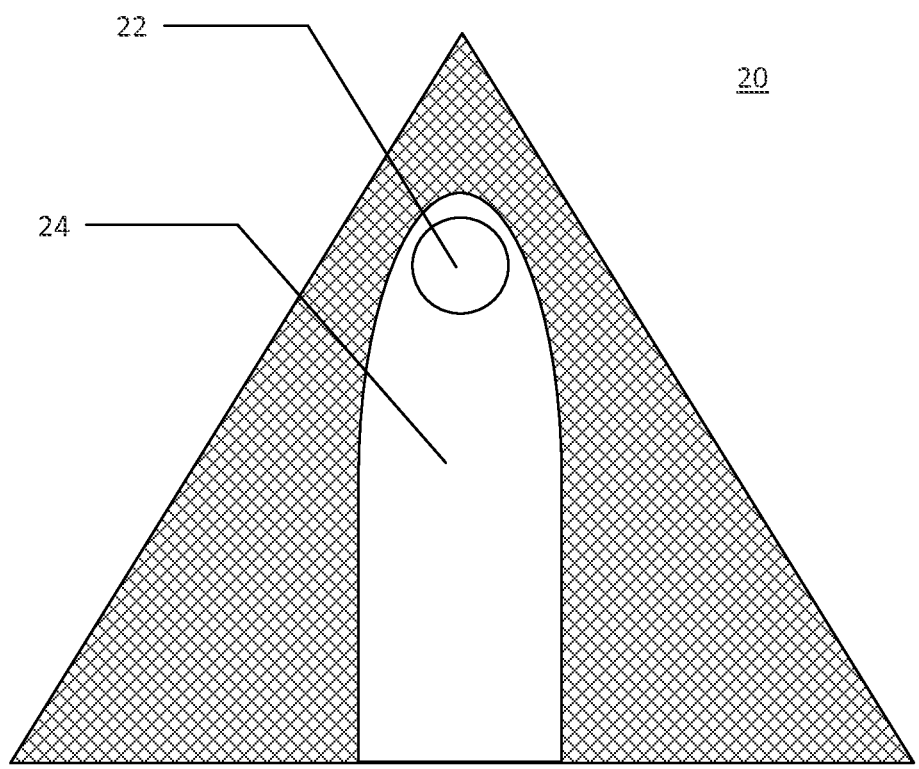

With reference now to FIG. 3b, there is shown the second or topside of the intermediate layer 20. The hatching in FIG. 3b indicates the area where the third layer of adhesive 70 resides with respect to the second or topside of the intermediate layer 20. As shown, the adhesive layer 70 may be essentially coextensive with the entire second or topside of the intermediate layer 20 except for an adhesive-free swath or strip extending from the hole 22 to a perimeter of the intermediate layer 20. Accordingly, when the top layer 30 is positioned atop or otherwise in contact with the adhesive layer 70, there is defined a channels 24 extending from the hole 22 to a periphery of the valve 100. In this way, the hole 22 is in selective fluid communication with the periphery of the valve 100 via the channel 24.

Figure 4A:
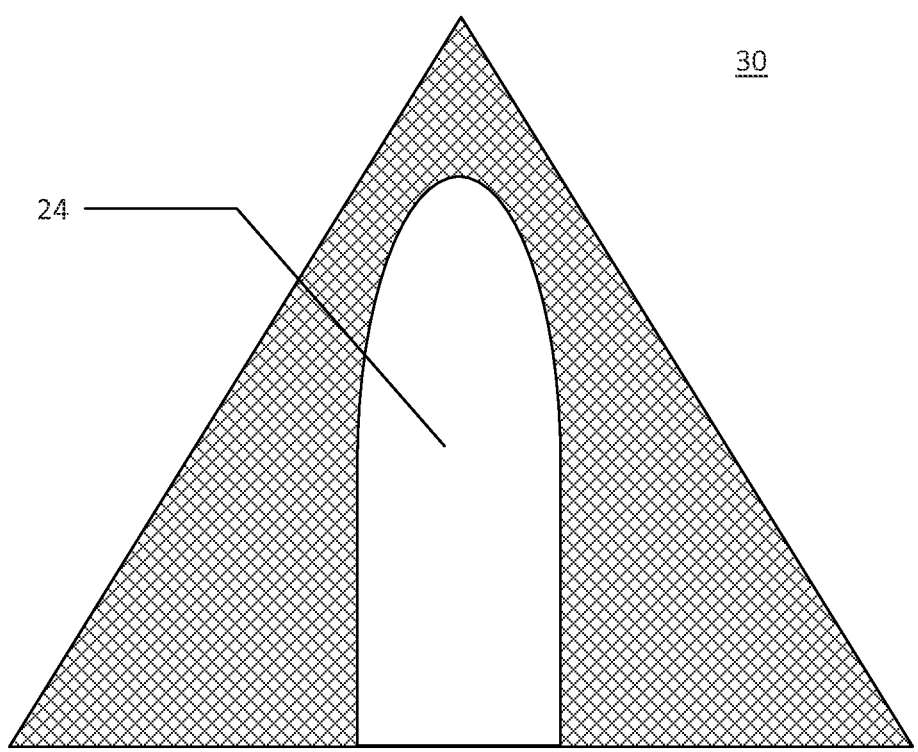
FIGS. 4a and 4b are diagrammatic illustrations showing opposing first and second sides of a top layer from the valve illustrated in FIG. 1.
Figure 4B:
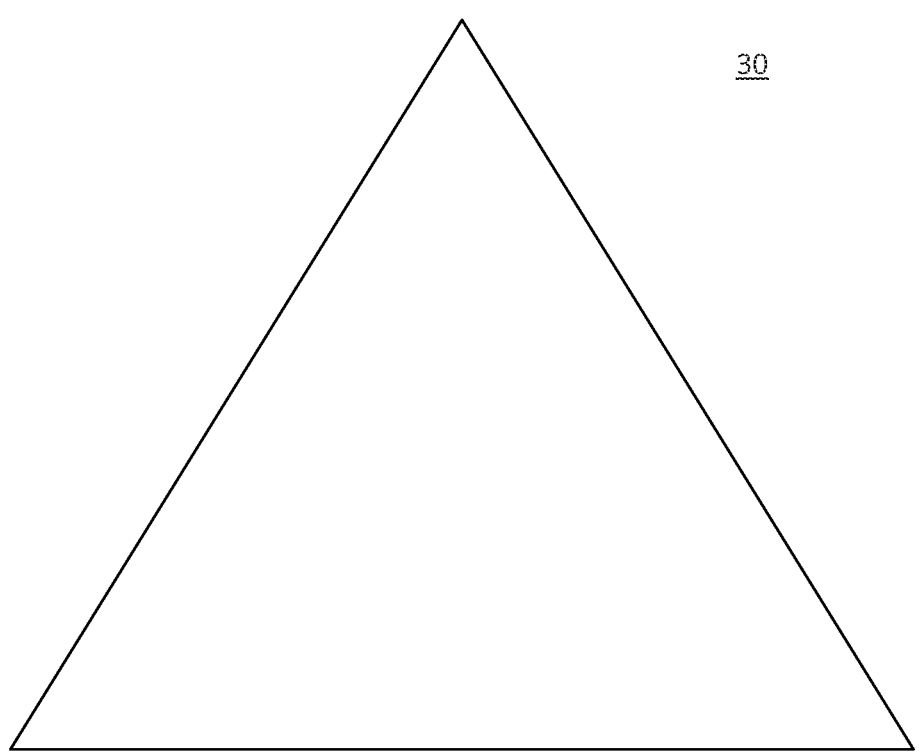

With reference now to FIGS. 4a and 4b, there are shown respectively the first or underside of the top layer 30 and an opposing second or topside of the top layer 30. The hatching in FIG. 4a indicates the area where the third layer of adhesive 70 resides with respect to the first or underside of the top layer 30.

Suitably, any one or more of the adhesive layers 50, 60 and/or 70 is optionally a Pressure Sensitive Adhesive (PSA), e.g., which is generally recognized as safe for indirect food packaging. The adhesive may be a form of an epoxy adhesive which is a versatile adhesive that can be used to join a variety of materials. Additionally, polyvinyl acrylate and toughened acrylics may also serve as suitable adhesives for selected embodiments. It is also contemplated that the adhesive layers may be a type of permanent adhesive in order to facilitate permanent adhesion of respective components and/or elements.

In practice, the base, intermediate and top layers 10, 20 and 30 of the valve 100 are constructed out of suitably flexible films or sheets of material. Without limitation, one suitable material includes, e.g., a polyester such as polyethylene terphthalate (PET). Optionally, any one or more of the base, intermediate and top layers 10, 20 and 30 may be constructed out of the same type of material or dissimilar materials may be used for any one or more of the aforementioned layers. In one embodiment, the top layer 30 may be constructed out of a foil laminate.

In one suitable embodiment, the valve 100 may be constructed and/or assembled by coating or otherwise applying the respective adhesive layers 50, 60 and/or 70 to one or more of the sides of the base, intermediate and/or top layers 10, 20, and/or 30 on which it resides and then laminating, sandwiching and/or stacking the layers together. Of course, as can be appreciated from the foregoing description of the figures, one or more of the various adhesive layers are discontinuous. Accordingly, such discontinuous adhesive layers may be achieved via pattern coating or the like. Suitably, multiple valves may be formed in webs or sheets of material that make up the various layers, and individual valves die cut or otherwise removed therefrom. Likewise, the holes 12 and 22 may be similarly die cut or otherwise formed in the respective material layers.

In use (e.g., as shown in FIG. 5), the valve 100 is suitably affixed to a wall or surface of the package 200 via the adhesive layer 50. Generally, the otherwise sealed package 200 will have or be provided one or more evacuation ports (i.e., holes, openings, apertures, etc.) in the wall and/or surface to which the valve 100 is affixed. When attaching the valve 100 to the package 200, suitably these ports are aligned and/or otherwise arranged to be in fluid communication with the holes 12 of the base layer 10. Suitably, the package 200 may contain roasted coffee beans or other offgassing product.

Returning attention to FIG. 2b, suitably each channel 14 is supplied with a drop or other portion of liquid material, e.g., in the regions 14a indicated by the dashed lines. Without limitation, a suitable liquid material may include oil, e.g., such as silicon oil, mineral oil, vegetable oil or the like. Optionally, the material may be another flowable liquid, e.g., of low viscosity. As used herein, a flowable liquid generally refers to a material having a state of matter in which atoms and/or molecules thereof can move freely among themselves and/or flow while remaining in contact with one another and/or being loosely bound by intramolecular forces. In practice, the flowable liquid is not solid, but rather, has a readiness to flow and thereby may generally take a shape of its container. However, the flowable liquid is also not a gas, and accordingly, it has little or no tendency to disperse as such and because pressure transmitted at one point of the flowable liquid is generally passed on to other points, the flowable liquid tends to have a volume which remains unchanged or only slightly changed under pressure, unlike a gas. Suitably, the oil or other liquid has a viscosity in the range of approximately (1 mPa·s) 1 cP (centipoises) to approximately 10,000 cP (10 Pa·s). In one exemplary embodiment, the viscosity is in the range of approximately 50 cP (50 mPa·s) to approximately 1,000 cP (10 Pa·s), and in yet another embodiment, the viscosity in the range of approximately 100 cP (100 mPa·s) to 350 cP, (350 mPa·s). The amount of oil or other liquid deposited in each channel 14 is suitably in the range of approximately 0.1 µl (microliter) to approximately 10 µl. In one exemplary embodiment, the amount is in the range of approximately 0.5 µl to approximately 6.0 µl, and in yet a further embodiment, the amount is in the range of approximately 1.0 µl to approximately 4 µl.

In operation, the valve 100 is closed, e.g., when $\Delta P < T_C$. In this state, due in part to the flexible nature of the various layers 10, 20 and 30, the channels 14 and/or 24 will be collapsed. That is to say, when the valve 100 is in the closed state, the first or underside of the top layer 30 will sag, cling to and/or otherwise contact the second or topside of the intermediate layer 20 along the region in which the channel 24 is otherwise defined, thereby preventing or inhibiting gas flow or fluid communication between the hole 22 and the periphery of the valve 100. Similarly, when the valve 100 is in the closed state, the first or underside of the intermediate layer 20 will sag, cling to and/or otherwise contact the second or topside of the base layer 10 along the region in which the channels 14 are otherwise defined, thereby preventing or inhibiting gas flow or fluid communication between the holes 12 and the hole 22. Suitably, in the latter instance, the liquid material deposited in the channels 14 facilitates sealing-off of the channels 14 in this case.

Conversely, when $\Delta P > T_O$ for example, the valve 100 opens as gas is expelled from an interior of the otherwise sealed package 200. Suitably, the expelled gas flows out the evacuation port or ports in the wall or surface of the package 200 through the valve 100 to an exterior environment outside the package 200. More specifically, the pressure $P_I$ inside the package 200 overcomes the external pressure $P_E$ and other forces acting to collapse, seal and/or otherwise close the channels 14 and 24 so as to open the aforementioned channels. That is to say, the first or underside of the intermediate layer 20 will become unseated and/or separated from the second or topside of the base layer 10 in the region where the channels 14 are defined, thereby permitting gas flow or fluid communication from the holes 12 to the hole 22 via the channels 14. Similarly, the first or underside of the top layer 30 will become unseated and/or separated from the second or topside of the intermediate layer 20 in the region where the channel 24 is defined, thereby permitting gas flow or fluid communication from the hole 22 to the periphery of the valve 100 via the channel 24.

In practice, a number of variables that influence various performance characteristics of the valve 100 may be manipulated and/or set during the manufacture, construction and/or assembly of the valve 100 in order to achieve one or more desired performance characteristics, e.g., such as a desired opening threshold $T_O$, a desired closing threshold $T_C$ and/or a desired flow rate R as a function of the pressure differential $\Delta P$. These variables include, e.g., the size of the holes 12 and/or 22, the width of the channels 14 and/or 24, the amount of oil or other liquid deposited in each channel 14 and the viscosity of the oil or other liquid deposited in each channel 14. In suitable embodiments, desirable performance characteristics include one or more of the following: an opening threshold $T_O$ in the range of approximately 0.05 psi to approximately 1.0 psi, or more specifically in the range of approximately 0.1 psi (689 Pa) to approximately 0.5 psi (3.45 kPa), or yet even more specifically in the range of approximately 0.1 psi (689 Pa) to approximately 0.4 psi (2.76 kPa); a closing threshold $T_C$ in the range of approximately 0.05 psi (345 Pa) to approximately 0.3 psi (2.07 kPa), or more specifically in the range of approximately 0.1 psi (689 Pa) to approximately 0.2 psi (1.38 kPa), or yet even more specifically in the range of approximately 0.12 psi (827 Pa) to approximately 0.17 psi (1.17 kPa); and a flow rate R of gas through the open valve 100 which is exponentially or roughly exponentially proportional to the pressure differential $\Delta P$. In short, by manipulating and/or setting one or more of the foregoing variables and/or otherwise designing and/or constructing the valve 100 to exhibit one or more of the foregoing performance characteristics, for example, the valve 100 helps protect against unwanted deformity of a package 200 containing roasted coffee beans or other like offgassing products, by allowing a suitable amount of gas to be released from the interior of the package 200 when it is initially packaged at a first relatively higher external pressure (e.g., at or near a ground level altitude), while still limiting an additional amount of gas released from the interior of the package 200 when it is subsequently exposed to a second relatively lower external pressure (e.g., when the package 200 is shipped over a higher altitude route, such as by airfreight or over a mountain).

To achieve one or more of the foregoing performance characteristics, one or more of the aforementioned variables may optionally be adjusted, manipulated and/or set (e.g., during the manufacturing, construction and/or assembly of the valve 100) so as to satisfy one or more of the following constrains. Suitably, the diameters of the holes 12 and/or 22 are in the range of approximately 0.01325 in (inches) (0.79375 mm) to approximately 0.45 in (1.14 cm). In one exemplary embodiment, the hole diameters are in the range of approximately 0.0625 (1.588 mm) to approximately 0.25 in (6.35 mm), and in still another embodiment, the hole diameters are in the range of approximately is 0.1 in (2.54 mm) to approximately 0.135 in (3.429 mm). Suitably, the amount of oil or other liquid deposited in each channel 14 is in the range of approximately 0.1 µl to approximately 10 µl. In one exemplary embodiment, the amount is in the range of approximately 0.5 µl to approximately 6.0 µl, and in yet a further embodiment, the amount is in the range of approximately 1.0 µl to approximately 4 µl. Suitably, a viscosity of the oil or other liquid is in the range of approximately 1 cP (1 mPa·s) to approximately 10,000 cP (10 Pa·s). In one exemplary embodiment, the viscosity is in the range of approximately 50 cP (50 mPa·S) to approximately 1 cP (1 P·s), and in yet another embodiment, the viscosity in the range of approximately 100 cP (100 mPa·s) to 350 cP (350 mPa·s). Suitably, the widths of the channels 14 and/or 24 are in the range of approximately 0.05 in (1.27 mm) to approximately 0.25 in (6.35 mm). In one exemplary embodiment, the channels widths are in the range of approximately 0.1 in (2.54 mm) to approximately 0.2 in (5.08 mm), and in yet another embodiment, the channel widths are in the range of approximately 0.105 in (2.667 mm) to approximately 0.14 in (3.56 mm). More generally, the ratio of hole diameter to channel width (hole diameter:channel width) is suitably in the range of approximately 0.03125:0.05 to approximately 0.45:0.25. In another exemplary embodiment, the ratio is in the range of approximately 0.0625:0.1 to approximately 0.25:0.2, and in yet another embodiment, the ratio is in the range of approximately 0.1:0.105 to approximately 0.135:0.14.

Figure 6:
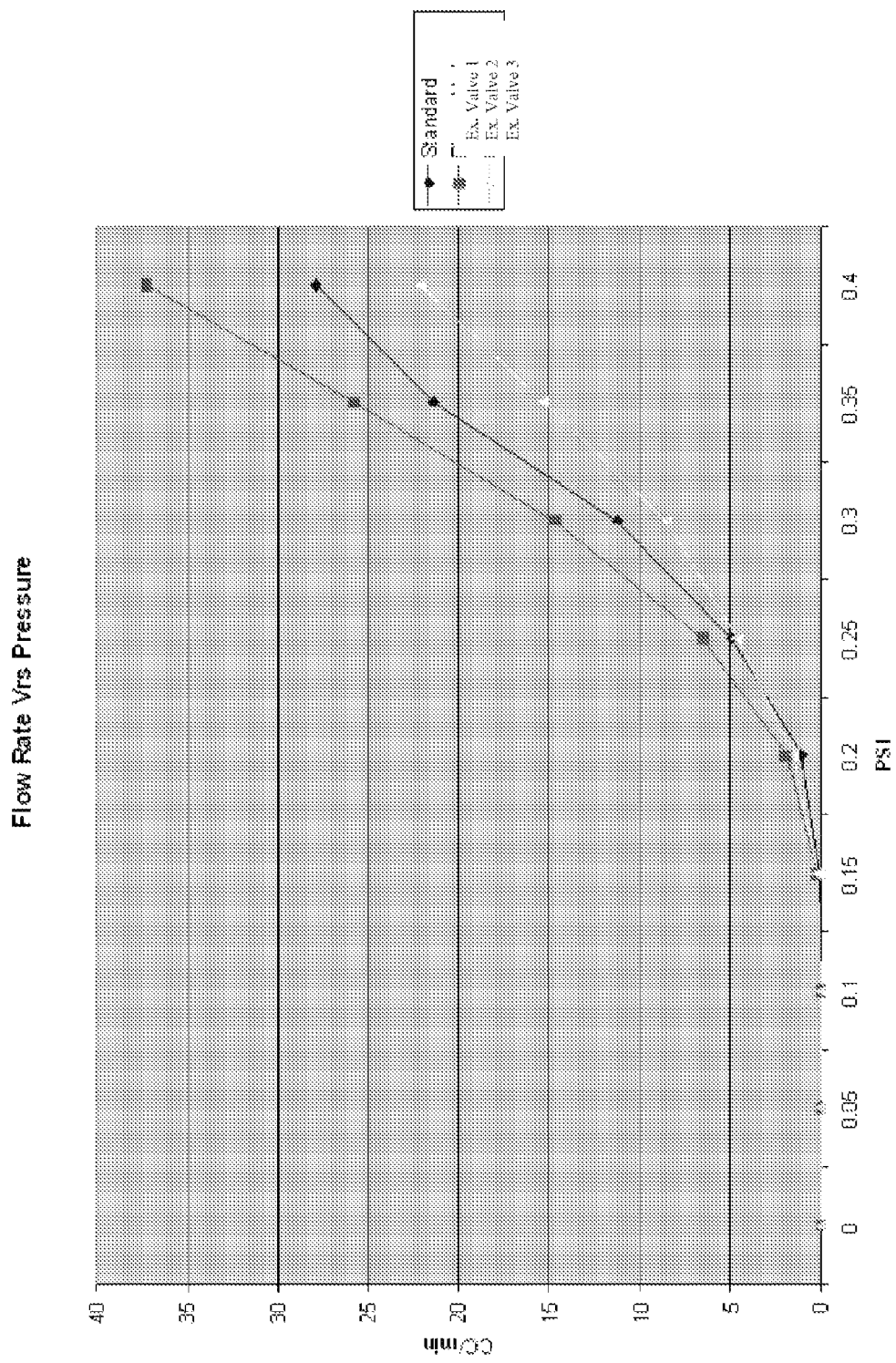
FIG. 6 is a graph showing for exemplary test valves the gas flow rates through the valves as a function of the pressure differentials on opposite sides of the valves, in accordance with aspects of the present inventive subject matter.

With reference now to FIG. 6, three exemplary valves 100 were constructed and tested. FIG. 6 is a graph on which curves have been plotted to show the flow rate R of gas through each of the respective valves as a function the pressure differential ΔP. As shown, when ΔP is below a given value (in this case approximately 0.15 psi) the valve is closed and accordingly the flow rate R of gas through the valve is essential zero or otherwise de minimis. When the valve is open (in this case when ΔP is above approximately 0.15 psi) the flow rate R of gas therethrough is exponentially or roughly exponentially proportional to the pressure differential ΔP. That is to say, in this region of the curve, R is for a large part exponentially proportional to ΔP.

The three exemplary valves had the following constructions:

|  | Example Valve 1 | Example Valve 2 | Example Valve 3 |
| --- | --- | --- | --- |
| Hole Size (diameter in inches) (millimeters) | 0.125 (3.175) | 0.25 (6.35) | 0.125 (3.175) |
| Liquid Amount (in mg) (Silicon fluid) | 2.0 | 2.0 | 2.0 |
| Liquid Viscosity (in cS centistrokes) (cm²/s)) | 100 (1) | 100 (1) | 100 (1) |
| Channel Width (in inches) (millimeters) | 0.105 (2.667) | 0.105 (2.667) | 0.140 (3.556) |

Figure 7:
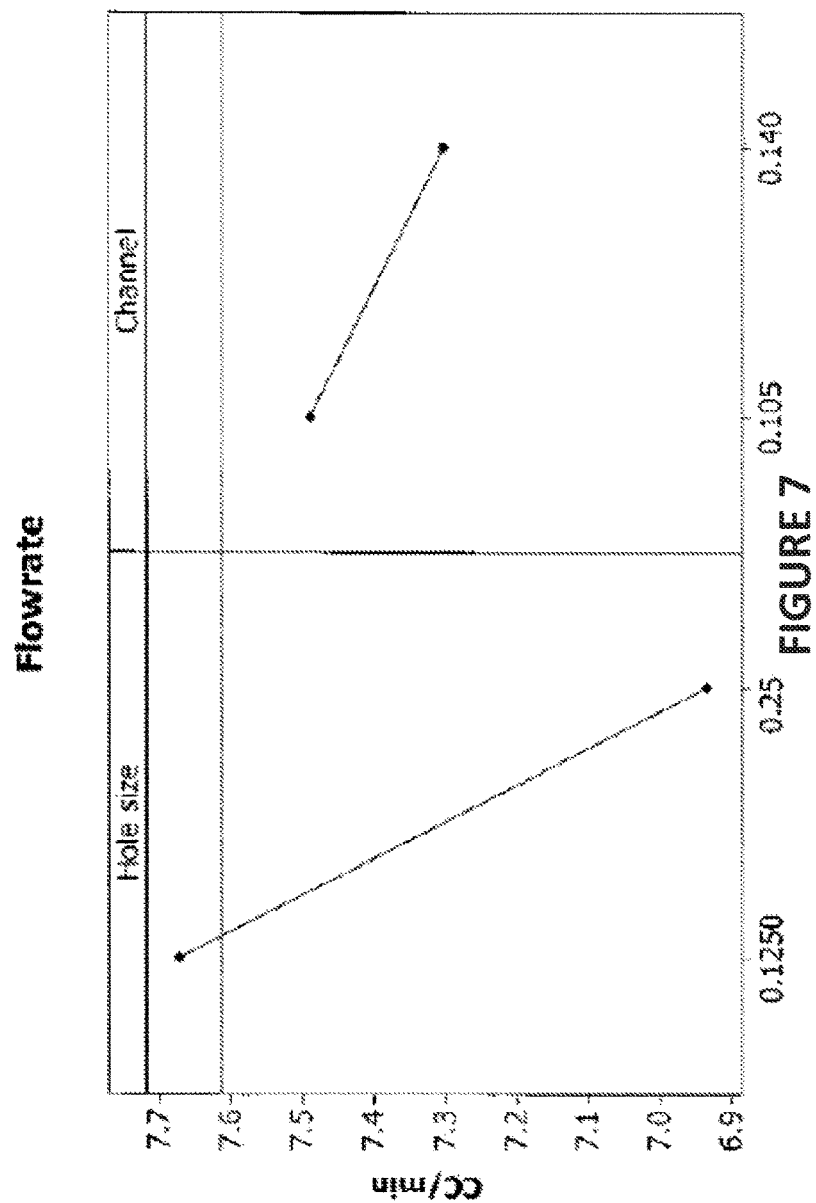
FIG. 7 is a graph showing a mean main effect on a flow rate through valves such as the one depicted in FIG. 1, as a result of manipulating the hole sizes and the channel widths in such valves.
Figure 8:
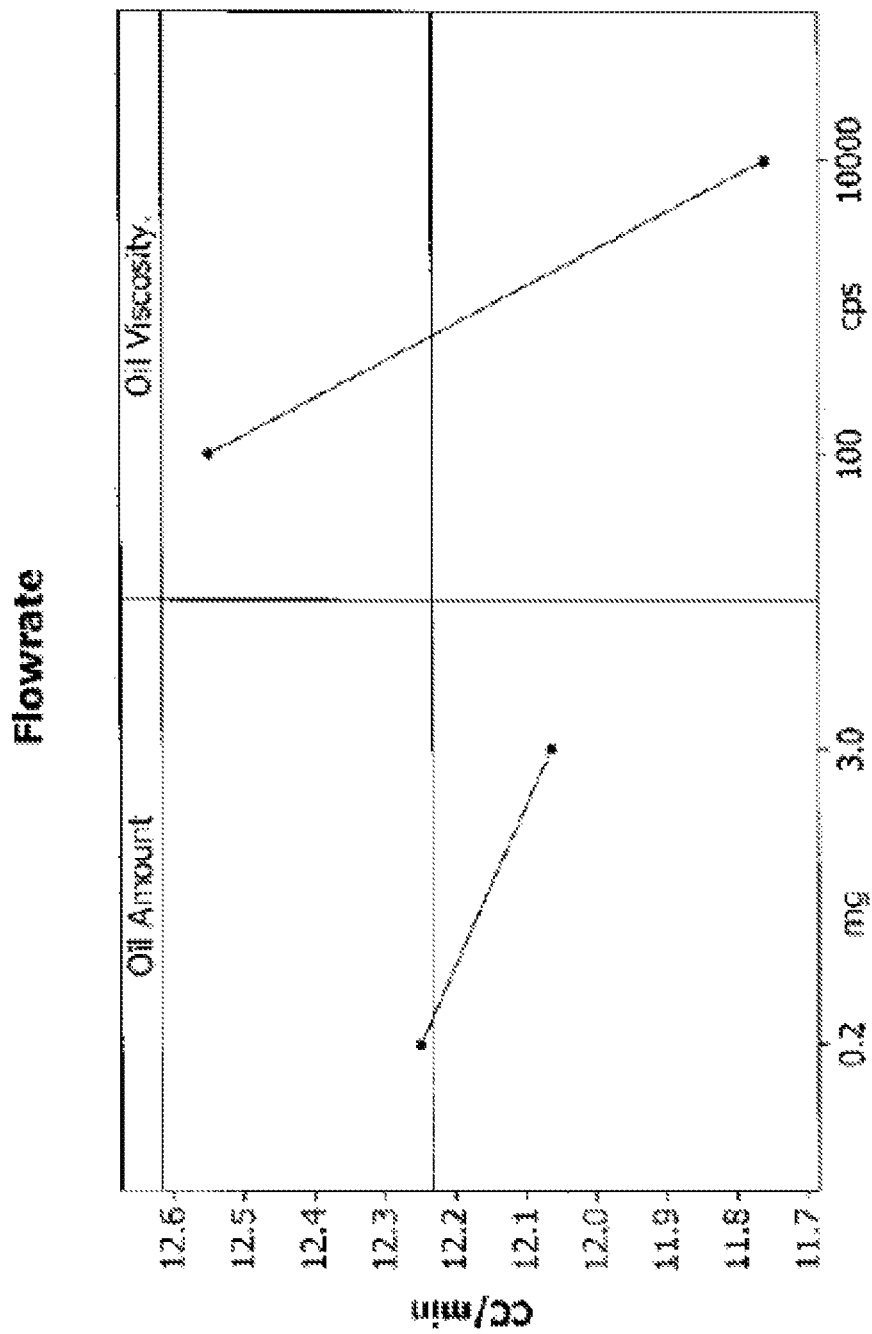
FIG. 8 is a graph showing a mean main effect on a flow rate through valves such as the one depicted in FIG. 1, as a result of manipulating the oil or other liquid amount and viscosity in such valves.
Figure 9:
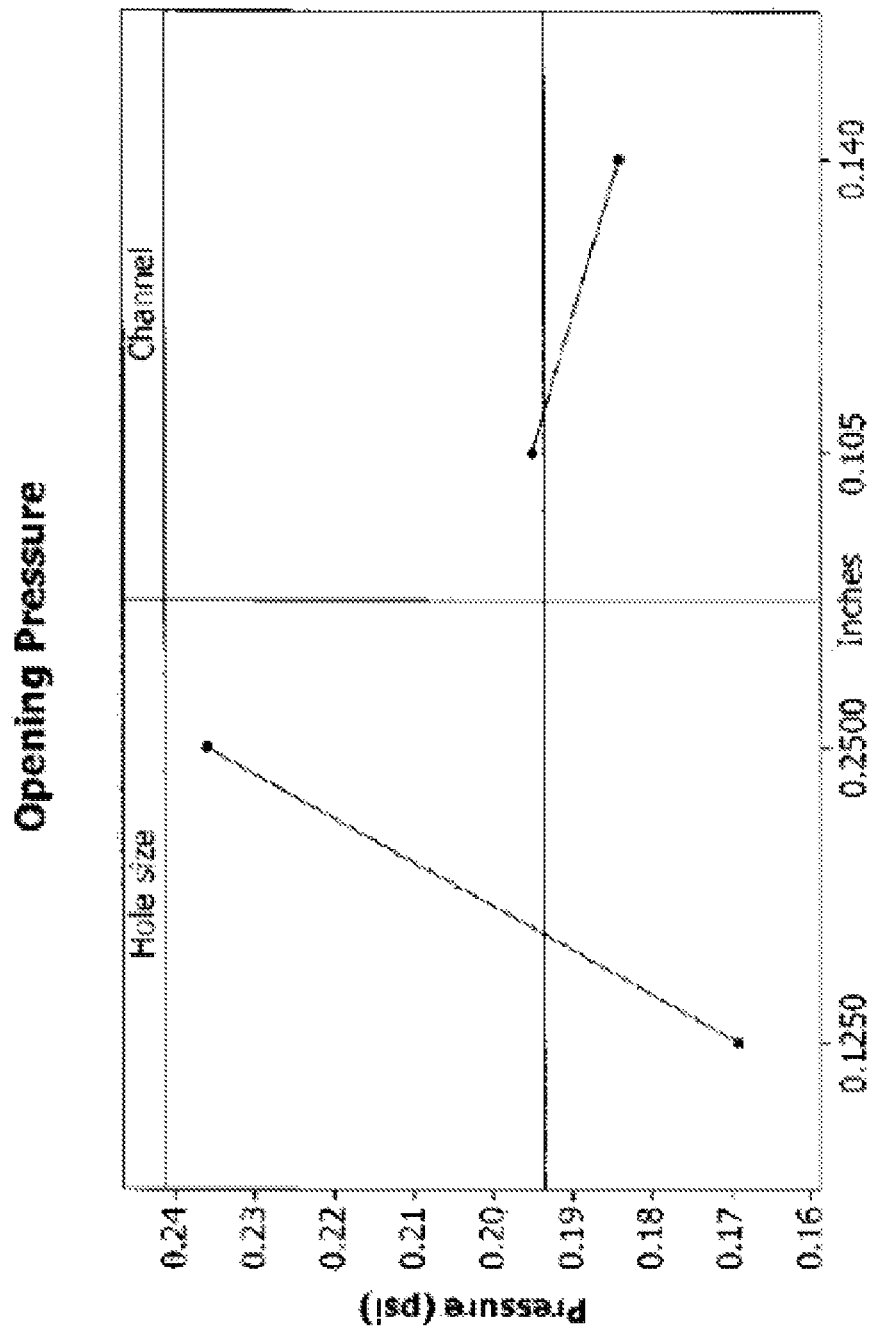
FIG. 9 is a graph showing a mean main effect on an opening threshold of valves such as the one depicted in FIG. 1, as a result of manipulating the hole sizes and the channel widths in such valves.
Figure 10:
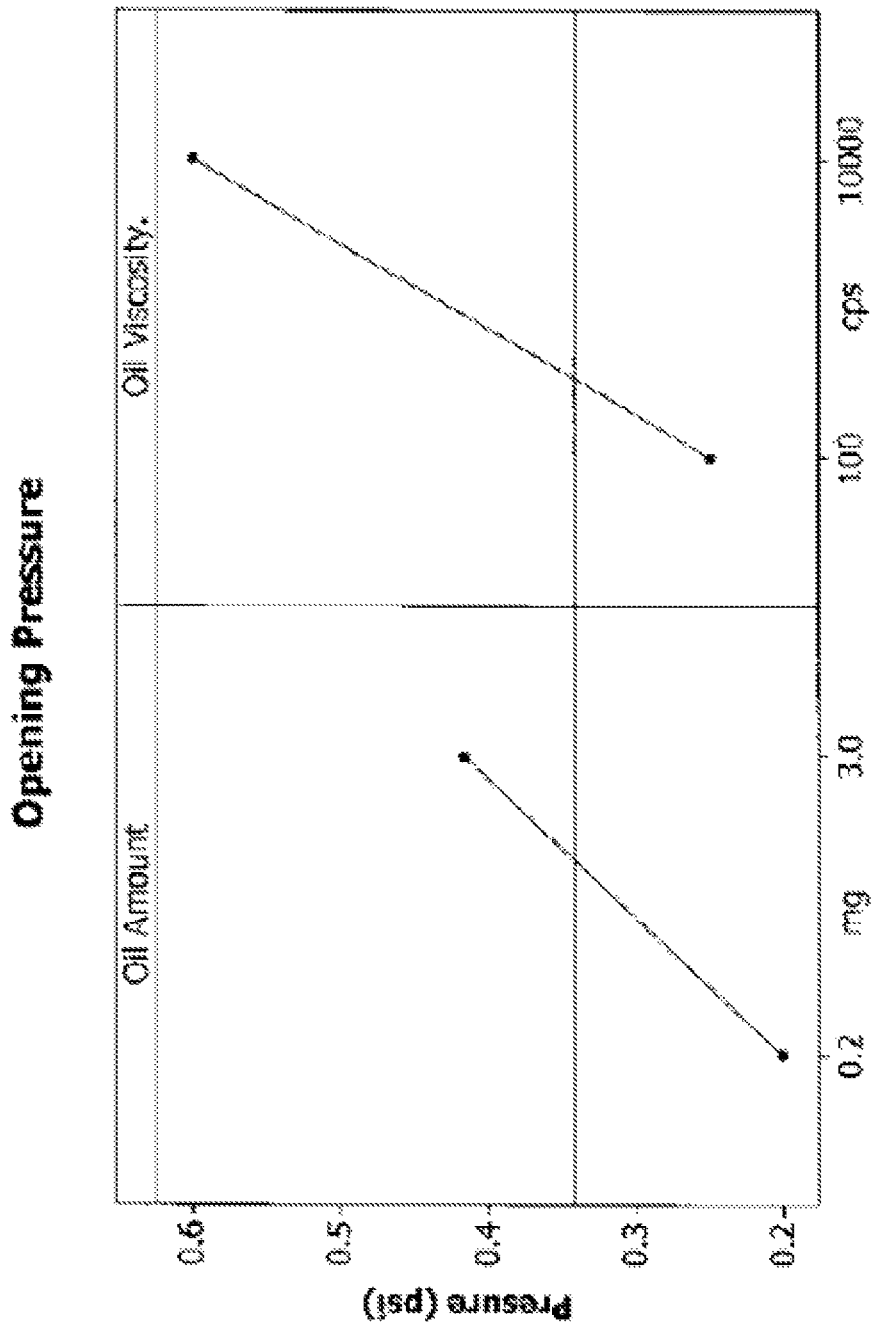
FIG. 10 is a graph showing a mean main effect on an opening threshold of valves such as the one depicted in FIG. 1, as a result of manipulating the oil or other liquid amount and viscosity in such valves.
Figure 11:
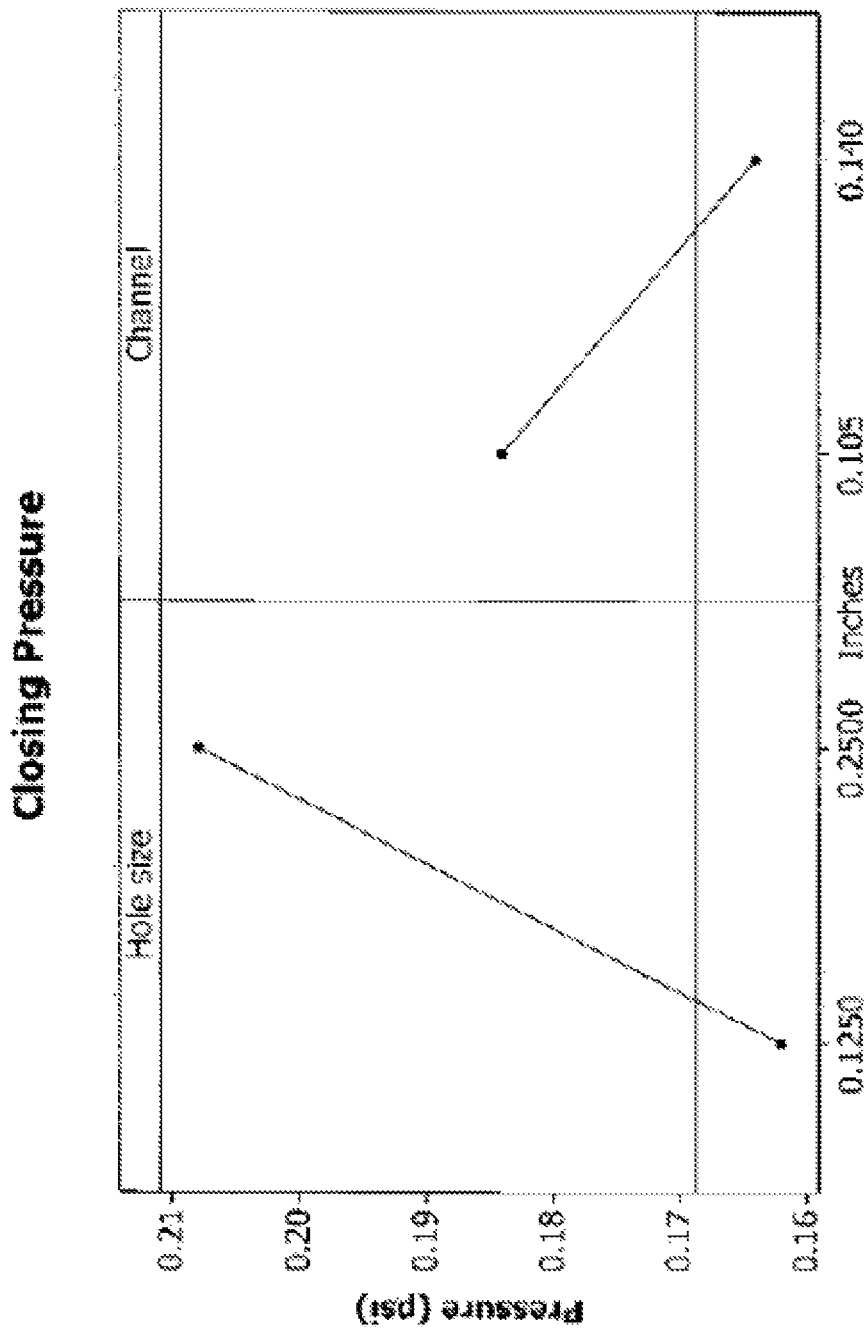
FIG. 11 is a graph showing a mean main effect on a closing threshold of valves such as the one depicted in FIG. 1, as a result of manipulating the hole sizes and the channel widths in such valves.

With reference now to FIGS. 7-12, various exemplary valves 100 were constructed and tested. For testing, a constant flow rate of air between approximately 10 cc/min (cubic centimeters per minute) to approximately 14 cc/min was applied to the test valve to simulate an increase in an internal package pressure. A pressure gauge was used to measure the increase in pressure until the tested valve opened. The maximum pressure reached was determined to be the tested valves opening pressure. The flow rate of air out of the valve was measured when the test system reached steady state and the flow rate was recorded. Similarly, to determine the closing pressure, the incoming flow rate of air was turned off and the package pressure decreased until the exit flow through the test valve reached zero, the pressure behind the valve was recorded as the closing pressure. The data from multiple trials was averaged, and the graphs in FIGS. 7-12 show the effect on various performance characterizes of the valve 100 as a result of changing selected variables. In particular, FIG. 7 shows the mean main effect on the flow rate R, as a result of manipulating the hole size and the channel width; FIG. 8 shows the mean main effect on the flow rate R, as a result of manipulating the oil or other liquid amount and viscosity; FIG. 9 shows the mean main effect on the opening threshold $T_O$, as a result of manipulating the hole size and the channel width; FIG. 10 shows the mean main effect on the opening threshold $T_O$, as a result of manipulating the oil or other liquid amount and viscosity; FIG. 11 shows the mean main effect on the closing threshold $T_C$, as a result of manipulating the hole size and the channel width; and, FIG. 12 shows the mean main effect on the closing threshold $T_C$, as a result of manipulating the oil or other liquid amount and viscosity. In general, it was observed that: a larger hole size then to increase the opening and closing thresholds, while having little effect on the flow rate; the altering the channel width has little effect on the flow rate, opening threshold or closing threshold; increasing the oil or other liquid amount greatly increases the opening threshold, while having little effect on the closing threshold and the flow rate; and, increasing the oil or other liquid viscosity greatly increases the opening threshold, while having little effect on the closing threshold and the flow rate.

While the valve 100 and/or the various layers 10, 20 and/or 30 have been shown as generally triangular in shape, it should be understood that other configurations and/or shapes are acceptable. Likewise, while the openings or holes 12 and 22 have been shown at various corners of the triangular shapes, other arrangements and/or locations for the holes are possible. Moreover, while the base layer 10 has been illustrated with two holes 12, and two channels 14 are defined therefrom to a single hole 22 in the intermediate layer 20, it is to be appreciated that more or fewer holes 12 may be included in the base layer 10 with corresponding channels extending to one or more holes 22 in the intermediate layer 20. Similarly, while a single hole 22 has been illustrated in the intermediate layer 20, and a single channel 24 is defined therefrom to a periphery of the valve 100, it is to be appreciated that one or more holes 22 may optionally be formed in the intermediate layer 20, with one or more channels 24 extending from any given hole 22 to the periphery of the valve 100. Additionally, while no holes have been shown in the top layer 30, it is to be appreciated that the top layer 30 may optionally be provisioned with one or more apertures, opening or holes and one or more of the channels 24 may extend thereto as opposed or in addition to extending to the periphery of the valve 100.

In the illustrated embodiments, the apertures, opening and/or holes 12 and 22 are shown as circular. Nevertheless, in other suitable embodiments, any one or more of the holes 12 and 22 may have different geometrical shapes or may be merely slits or other suitable perforations or patterns of slits and/or patterns of perforations. Additionally, in the illustrated embodiments, a perimeter or periphery of the various layer are aligned with one another and the layers of the multi-layer construction are substantially juxtapositioned on one another. However, it is contemplated that the multiple layers may be splayed slightly out of alignment from one another or may be positioned so to accommodate different packaging, designs and/or applications as desired.

Additionally, the valve 100 has been described for use in connection with packaging for roasted coffee and/or the like. However, it is to be appreciated that the valve 100 may be used in other applications and/or with packaging for other materials which may create pressure changes or variations within the packaging, e.g., due to matter phase changes or chemical or physic reactions experienced by the package contents for one reason or another. For example, during shipping or other transportation, packaged baby wipes or the like may experience temperature changes which result in a liquid-to-gas phase change of material contained in the baby wipes. The generated gas trapped in the package can alter the interior pressure. Accordingly, the valve 100 can be useful to relieve such a pressure build-up. Likewise, packaged concrete may undergo pressure altering reactions and the valve 100 can be useful to regulate the interior package pressure in this case.

In short, while aspects of the inventive subject matter herein have been described in connection with exemplary and/or other embodiments, it will be apparent to those of ordinary skill in the art that the invention is not to be limited to the disclosed embodiments, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A multi-layer control device comprising:
    a first layer having at least one first opening formed therein;
    a second layer having at least one second opening formed therein, the at least one second opening being positioned distal to the first opening, said first and second layers being joined together such that there is a space separating the first and second layers and defining at least one first channel between the first and second layers, the first channel selectively permitting gas flow from the first opening to the second opening of the second layer;
    a third layer covering the second layer, said second and third layers being joined together by a second adhesive layer, the second adhesive layer defining an adhesive free path in communication with the second opening of the second layer and extending to a perimeter of the third layer such that at least one second channel is defined between the second layer and the third layer which selectively permits gas flow from the second opening of the second layer through the second channel and out of the device; and,
    an amount of flowable liquid deposited in the first channel between the first and second openings.

2. The device of claim 1, said device being a one-way valve that selectively opens and closes to permit and inhibit respectively gas flow therethrough, wherein at least two of the first, second and third layers are made from a sufficiently flexible material such that when the valve is closed, the second layer and first layer are drawn towards one another in a region of the first channel thereby inhibiting gas flow through the first channel and the third layer and the second layer are drawn towards one another in a region of the second channel thereby inhibiting gas flow through the second channel; and when the valve is opened, the second and first layers are pushed away from one another in the region of the first channel and the third and second layers are pushed away from one another in the region of the second channel.

3. The device of claim 2, wherein the first and second layers are joined by an adhesive layer, the adhesive layer comprising an adhesive free swath which defines the first channel.

4. The device of claim 1, wherein the device is a one-way valve that selectively opens to permit gas flow through the first and second channels in response to a pressure differential on opposing sides of the valve exceeding an opening threshold.

5. The device of claim 4, wherein the opening threshold is in a range of 0.05 psi (345 Pa) to 1.0 psi (6.89 kPa).

6. The device of claim 4, wherein when the valve is open, a rate of gas flow through the valve is exponentially proportional to the pressure differential.

7. The device of claim 1, wherein the device is a one-way valve that selectively closes to inhibit gas flow through the first and second channels in response to a pressure differential on opposing sides of the valve being below a closing threshold.

8. The device of claim 7, wherein the closing threshold is in a range of 0.05 psi (345 Pa) to 0.3 psi (2.07 kPa).

9. The device of claim 1, wherein at least one of the first and second openings has a diameter in a range of 0.01325 in (0.79375 mm) to 0.45 in (1.14 cm).

10. The device of claim 1, wherein at least one of the first and second channels has a width in a range of 0.05 in (1.27 mm) to 0.25 in (6.35 mm).

11. The device of claim 1, wherein a ratio of a diameter of at least one of the first and second openings to a width of at least one of the first and second channels is in a range of 0.03125:0.05 to 0.45:0.25.

12. The device of claim 1, wherein the liquid is an oil.

13. The device of claim 12, wherein the oil is one of a silicone oil, vegetable oil or mineral oil.

14. The device of claim 1, wherein the amount of liquid is in a range 0.1 µl to 10 µl.

15. The device of claim 1, wherein the liquid has a viscosity in a range of 1 cP (1 mPa·s) to 10,000 cP (10 Pa·s).

16. The device in claim 1, wherein at least one of the first, second and third layers is PET.

17. The device of claim 3, wherein said adhesive layer extends around a perimeter and includes a protruding region extending from the perimeter inwardly.

18. A receptacle having a multi-layer control device according to claim 1.

19. A method of making a one-way valve comprising the steps of:
    providing a first layer;
    forming at least one first opening in said first layer;
    providing a second layer;
    forming at least one second opening in said second layer;
    joining said first and second layers together wherein the at least one first opening is positioned distal to the at least one second opening, and where the first and second layers are joined such that there is a space separating the first and second layers defining at least one first channel between the first layer and the second layer which selectively permits gas flow from the first opening to the second opening;

providing a third layer;

joining said second and third layers together with an adhesive disposed in a manner such that at least one second channel is defined by an adhesive free path between the second and third layers which selectively permits gas flow from the second opening out of the valve; and, supplying an amount of flowable liquid in the first channel between the first and second openings.

20. The method of claim 19, wherein the valve is made so as to selectively open to permit gas flow through the first and second channels in response to a pressure differential on opposing sides of the valve exceeding an opening threshold, said opening threshold being in a range of 0.05 psi (345 Pa) to 1.0 psi (6.89 kPa).

21. The method of claim 20, wherein the valve is made so that when open, a rate of gas flow through the valve is exponentially proportional to the pressure differential.

22. The one-way valve of claim 1, wherein the second channel extends to a periphery of the valve.

\* \* \* \* \*